D. W. EVANS.
DRAFT RIGGING FOR TRACTORS.
APPLICATION FILED JULY 26, 1919.

1,347,448.

Patented July 20, 1920.
2 SHEETS—SHEET 1.

Inventor,
Daniel W. Evans.
By
Attorney

D. W. EVANS.
DRAFT RIGGING FOR TRACTORS.
APPLICATION FILED JULY 26, 1919.
1,347,448.
Patented July 20, 1920.
2 SHEETS—SHEET 2.
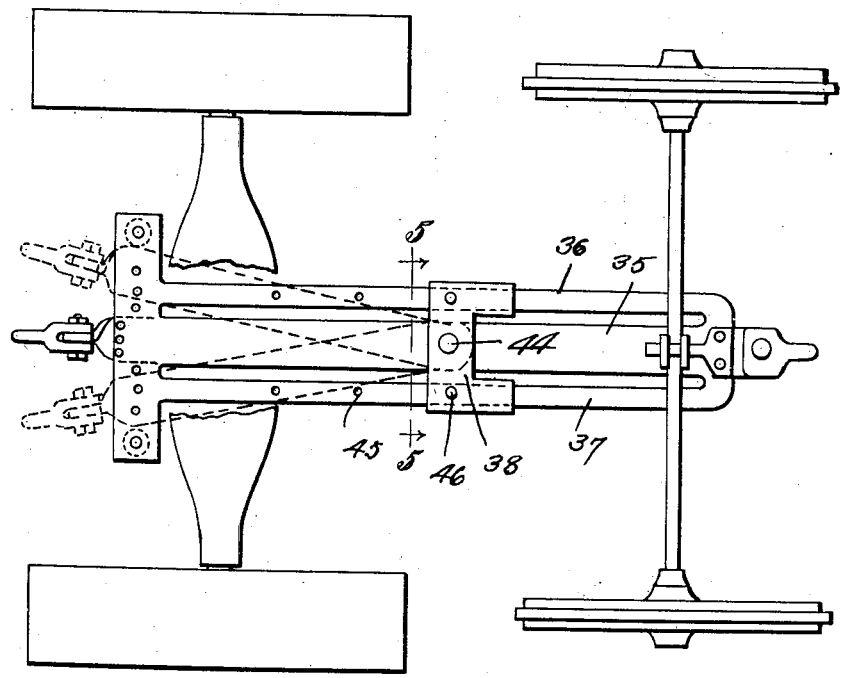
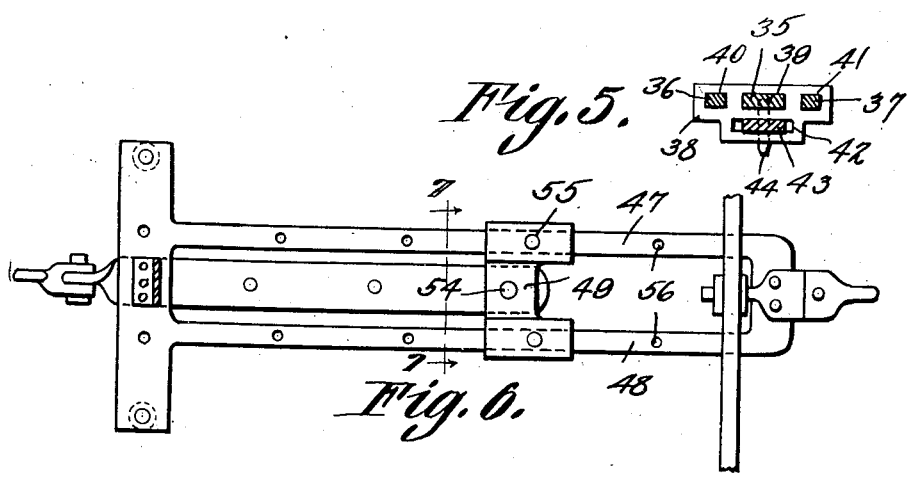
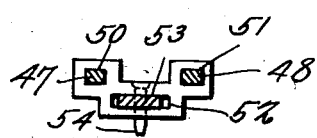
Inventor,
Daniel W. Evans.
Attorney

UNITED STATES PATENT OFFICE.

DANIEL W. EVANS, OF SCRANTON, PENNSYLVANIA.

DRAFT-RIGGING FOR TRACTORS.

1,347,448.  Specification of Letters Patent.  Patented July 20, 1920.

Application filed July 26, 1919. Serial No. 313,489.

*To all whom it may concern:*

Be it known that I, DANIEL W. EVANS, a citizen of the United States of America, and resident of Scranton, in the county of Lackawanna and State of Pennsylvania, have invented certain new and useful Improvements in Draft-Rigging for Tractors, of which the following is a specification.

This invention relates to couplings or attachments whereby motor vehicles, tractors or the like may be connected to vehicle rolling stock or the like, either in the front or rear so that such vehicle rolling stock or the like may be pushed or pulled.

From the introductory paragraph, it will be apparent that the invention is susceptible of general application and therefore the inventor wants it understood that he is not to be limited with respect to the uses of the invention and while mention has been made of motor vehicles and rolling stock, it is to be understood that the invention is capable of use in a great many different ways and hereafter in the specification, reference will be made to a "device to be pulled" and also to a "device to be pushed," which general terms are understood to refer to any vehicle, car or device to which a tractor or motor is to be coupled or hitched.

Specifically, an object of this invention is to provide means of the character indicated which will adapt itself to motors or tractors, the axles of which have different relations to the crank cases or other depending portions of the motor-crank-case or chassis or body, it being the purpose of the inventor to provide novel means whereby the device being drawn will have certain free movement laterally with respect to the coupling, which coupling might be regarded as a part of the draw bar or draft rigging.

A further object of this invention is to produce a draft rigging, one member of which is adjustable with relation to a stationary bar or bars, so that the device being pulled may be closely or more remotely coupled according to the requirements in practice and conditions of use.

A further object of the invention is to provide a draft rigging of the character indicated which will possess advantages in points of strength and durability, as well as efficiency.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Fig. 4 illustrates a plan view partially broken away, showing the modified construction of the invention;

Fig. 5 illustrates a sectional view on the line 5—5 of Fig. 4;

Fig. 6 is a plan view of a further modification; and

Figure 1:
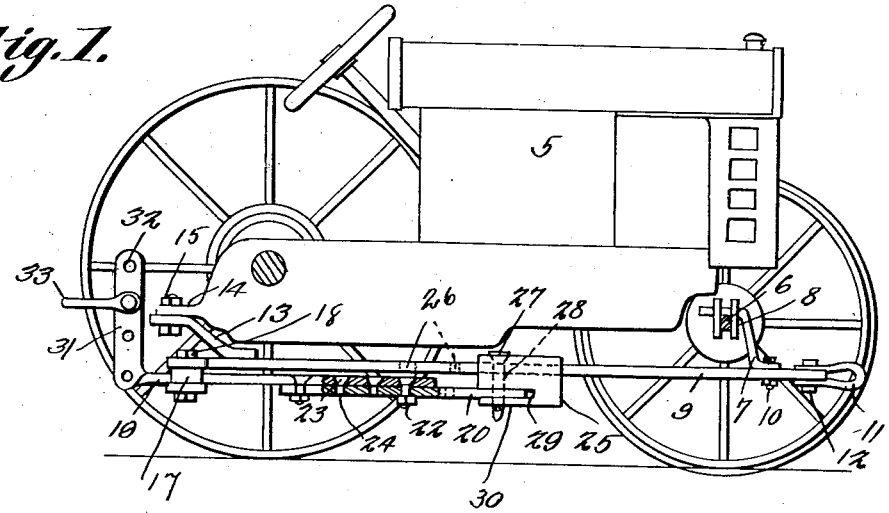
Figure 1 illustrates a view in elevation of a conventionally shown tractor having the draft rigging in section applied thereto.

Fig. 7, a sectional view on the line 7—7 of Fig. 6.

In these drawings, the tractor, as stated, is shown conventionally and I do not wish to be limited with respect to the device to which the draft rigging is applied and I regard the term tractor as including propelled vehicles of any type, although the one shown is adapted to a Fordson tractor.

In carrying the invention into practice, therefore, I employ a tractor 5 having a front axle 6 to which front axle a bracket 7 is attached by clips 8. The construction of the clips may be variously modified but the arm is preferably broad and is attached to the draft beam 9 by fastenings 10, such as bolts.

The forward end of the draft beam or beams has a link 11 connected to it by the pivot 12 so that the link may oscillate transversely and it may be connected to any device to be pushed by the tractor or, under certain conditions, the device ahead may be pulled by backing the tractor, but normally, of course, the device ahead would be regarded as the device to be pushed. The draft beam or beams has an upwardly and rearwardly extending arm 13 secured to an extension 14 of the frame of the tractor by fastenings such as bolts 15. The arm is preferably welded on the draft beam 9, although other means of securing it may be adopted.

The draft beam, at its forward end, has laterally extending arms 15^b or the said draft beam may be T-shaped so that the lateral extensions 15^b may be regarded as the head of the draft beam. A plate 16 underlies the lateral extensions 15^b and is spaced therefrom by collars 17 held in place by bolts 18 passing through the lateral extensions 15^b and the said plate 16. A clearance is therefore formed between the lateral extensions and the plate in which a section 19 of the draw bar may be adjusted, that is to say, said section 19 of the draw bar may oscillate and move longitudinally of the space between said lateral extensions and the plate or transversely of the tractor. The section 19 of the draw bar coacts with another section 20 thereof, and the two sections are adjustably connected together by bolts 21 and 22 which may be applied to apertures 23 and 24 in the sections 19 and 20 respectively so that one section may be moved with relation to the other until the apertures of one alines with those of the other and then the bolts can be inserted and the parts secured in the different positions of adjustment so as to lengthen or shorten the draw bar.

A housing or block 25 is slidable on the draft beam and the said draft beam has apertures 26 in it for the reception of a pin 27 which pin passes through an aperture 28 of the block so that the said block may be held at different positions of adjustment on the draft beam. The block has a recess 29 in one end in which the section 20 of the draw bar extends and the said draw bar has an aperture 30 through which the pin 27 extends, the said pin constituting a pivot with relation to which the draw bar may oscillate so that the draw bar is connected to the draft beam through the block and pin as shown and described.

The rear end of the section 19 of the draw bar has an upstanding draw head or hitch 31 with several holes 32 which makes it suitable for several draft changes as needed for certain implements, as harrows, plows, wagons, etc., and if desired a link 33 may be pivotally connected to the head 31 and the connection may be made in any one of the apertures 32.

Figure 2:
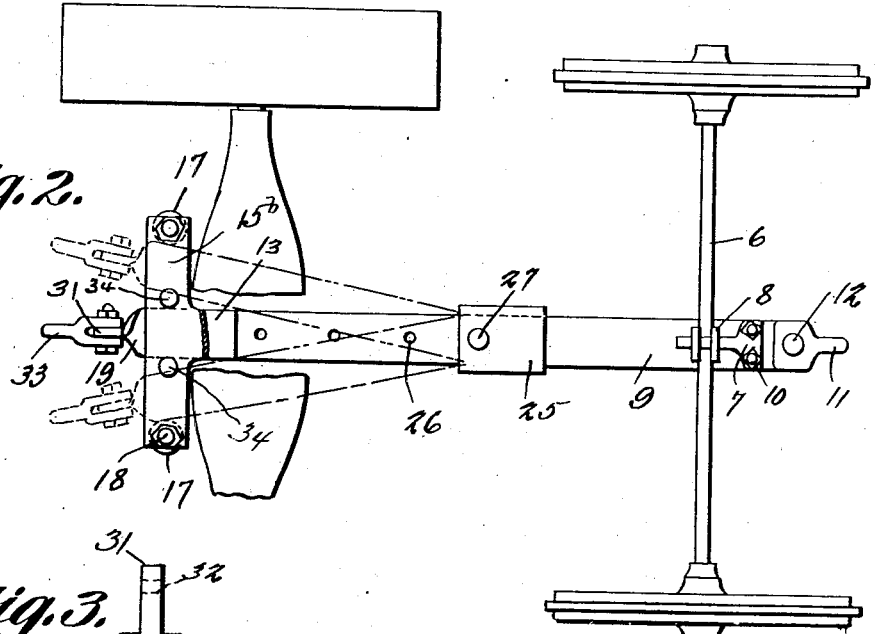
Fig. 2 illustrates a plan view thereof, omitting such parts as would obstruct a view of the draft rigging.
Figure 3:
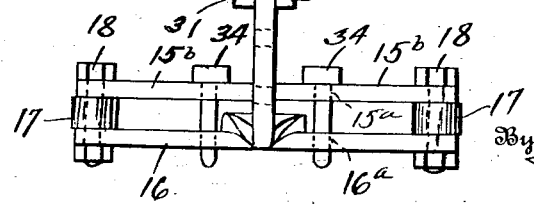
Fig. 3 illustrates a front elevation of the draft rigging.

The lateral extensions 15 and the plate 16 have alining apertures 15^a and 16^a respectively, the said alining apertures being adapted to receive pins 34 by which the draw bar may be held in different positions of adjustment, viz: centrally of the tractor, as shown in Fig. 2 or the draw bar may be caused to project obliquely as shown in dotted lines, Fig. 2, toward either side, the said draw bar being held in any of these adjusted positions by means of the pins 34.

From the foregoing description, it will be seen that the draw bar consists of two members so supplied with suitable holes as to permit either increasing the length or shortening the draw bar as the necessities of the case may require.

In the modification shown in Fig. 4, the member corresponding to the draft beam 9 comprises a central bar 35 and two side bars 36 and 37 parallel with it and preferably all formed integral.

The manner of attaching a draw bar of this type to the tractor is precisely the same as that heretofore described in connection with the disclosure of the frame pin in Figs. 1 and 2, and further detailed description thereof is believed unnecessary.

The housing or block 38 of the modified construction has a central aperture 39 which receives the central bar 35 and the apertures 40 and 41 which receive the bars 36 and 37 respectively. The block has an aperture 42 in which the draw bar 43 is oscillatably mounted on the pin 44 and the said pin further serves as a means for connecting the block 38 to the central bar 35. The bars 36 and 37 are apertured as at 45 to receive securing devices such as pins 46 which aid in holding the block at different positions of adjustment. The device of the modification is otherwise similar to the frame shown in Fig. 1 and the draw bar has the adjustments provided for in said figure.

In Figs. 6 and 7 the draft beam consists of an approximately rectangular frame having the side bars 47 and 48 and the block 49 has apertures 50 and 51 to receive the bars 47 and 48 respectively. The block also has an aperture 52 in which the draw bar 53 is oscillatably mounted on the pin 54. The block is held at different positions of adjustment on the bars 47 and 48 by the pins 55 which pass through apertures to the block and apertures 56 in the bars so that the block may be held at different positions of adjustment as in the other frames.

I claim—

1. In a draft rigging for tractors, a draft beam, a bracket connecting the draft beam at one end to an axle, means for connecting the opposite end of the draft beam to a tractor frame, said draft beam having apertures therein, a block secured on the draft beam, a draw bar, pivotally connected to the block, a coupling member on one end of the draft beam, and a coupling member on the end of the draw bar.

2. In a draft rigging for tractors, a draft beam, a bracket connecting the draft beam at one end to an axle, means for connecting the opposite end of the draft beam to a tractor frame, said draft beam having apertures therein, a block adjustably secured to the draft beam, a draw bar, a member for pivotally connecting the block to the draw bar, a coupling member on one end of the draft beam, a coupling member on the end of the draw bar, and means for adjustably supporting the draw bar laterally.

3. In a draft rigging, a draft beam, means for rigidly attaching the draft beam to the chassis of a motor driven vehicle, a block slidable on the draft beam, means for attaching the block in different positions of adjustment, a draw bar, means for pivotally connecting the draw bar to the block, a member for supporting the draw bar, means carried by the chassis for supporting the member, and means for connecting the draw bar to the drawn member.

4. In a draft rigging, a draft beam, means for rigidly attaching the draft beam to the chassis of a motor driven vehicle, a block slidable on the draft beam, means for attaching the block in different positions of adjustment, a draw bar, means for pivotally connecting the draw bar to the block, a member connected to the draft beam for supporting the draw bar, means carried by the chassis for supporting the draft beam, means for connecting the draw bar to the drawn member, and means for connecting the draft beam to a pushed member.

5. In a draft rigging, a draft beam, means for connecting the draft beam to the chassis of a motor vehicle, a block adjustably connected to the draft beam, a sectional draw bar, means for pivotally connecting the sectional draw bar to the block, means for adjustably connecting the sections of the draw bar, and an apertured head on the draw bar.

6. In a draft rigging, a draft beam, means for connecting the draft beam to the chassis of a motor vehicle, a block adjustably connected to the draft beam, a sectional draw bar, means for pivotally connecting the sectional draw bar to the block, means for adjustably connecting the sections of the draw bar, means for connecting the draw bar to a trailer, and a guide carried by the draft beam for supporting the draw bar.

7. In a draft rigging, a draft beam, means for connecting the draft beam to the chassis of a motor vehicle, a block adjustably connected to the draft beam, a sectional draw bar, means for pivotally connecting the sectional draw bar to the block, means for adjustably connecting the sections of the draw bar, means for connecting the draw bar to a trailer, lateral extensions on the said draft beam, a plate supported in spaced relation to the said lateral extensions and constituting therewith guides for the draw bar, and means for holding the draw bar at different positions of adjustment laterally of the chassis.

8. In a draft rigging, a draft beam, means for connecting the draft beam to the chassis of a motor vehicle, a block adjustably connected to the draft beam, a sectional draw bar, means for pivotally connecting the sectional draw bar to the block, means for adjustably connecting the sections of the draw bar, means for connecting the draw bar to a trailer, lateral extensions on the said draft beam, a plate supported in spaced relation to the said lateral extensions and constituting therewith guides for the draw bar, the said lateral extensions and plate having apertures therein, pins in said apertures for holding the draw bar at different positions of adjustment laterally of the chassis.

9. In a draft rigging, a draft beam comprising a central bar and integral side bars spaced therefrom, a block having apertures to receive the said bars to effect a sliding engagement between the said bars and the said block, means engaging the said block and bars for holding the block at different positions of adjustment, a draw bar pivotally connected to the said block, and means for attaching the said draw bar to a tractor.

10. In a draft rigging, a draft beam comprising an approximately rectangular frame having side bars, a block having apertures to receive the side bars to effect sliding engagement between the said block and the said side bars, a draw bar and means for pivotally connecting the draw bar to the said block.

DANIEL W. EVANS.